No. 721,535. PATENTED FEB. 24, 1903.
J. B. BOYLAN, Jr.
DEVICE FOR EXTERMINATING RODENTS.
APPLICATION FILED JUNE 4, 1902.
NO MODEL.

WITNESSES

INVENTOR
John B. Boylan Jr.
By L. M. Thurlow,
ATTY.

UNITED STATES PATENT OFFICE.

JOHN B. BOYLAN, JR., OF PEORIA, ILLINOIS.

DEVICE FOR EXTERMINATING RODENTS.

SPECIFICATION forming part of Letters Patent No. 721,535, dated February 24, 1903.

Application filed June 4, 1902. Serial No. 110,243. (No model.)

*To all whom it may concern:*

Be it known that I, JOHN B. BOYLAN, Jr., a citizen of the United States, residing at Peoria, in the county of Peoria and State of Illinois, have invented certain new and useful Improvements in Devices for Exterminating Rodents; and I do hereby declare that the following is a full, clear, and exact description of the invention, which will enable others skilled in the art to which it appertains to make and use the same.

This invention pertains to devices for use in destroying pests—such as ground-squirrels, moles, and the like—by introducing poisonous fumes into their burrows under ground.

My invention also pertains to certain details of construction that will be pointed out in the accompanying claim.

My object is to provide a simple yet effective device for the above purpose that can be easily carried around in the discharge of one's ordinary duties and when found necessary can be used almost instantly to destroy an animal when its nest or burrow is found.

In order to carry out fully the idea of my invention and show its use and construction, I have provided the accompanying drawings, in which—

Figure 1:
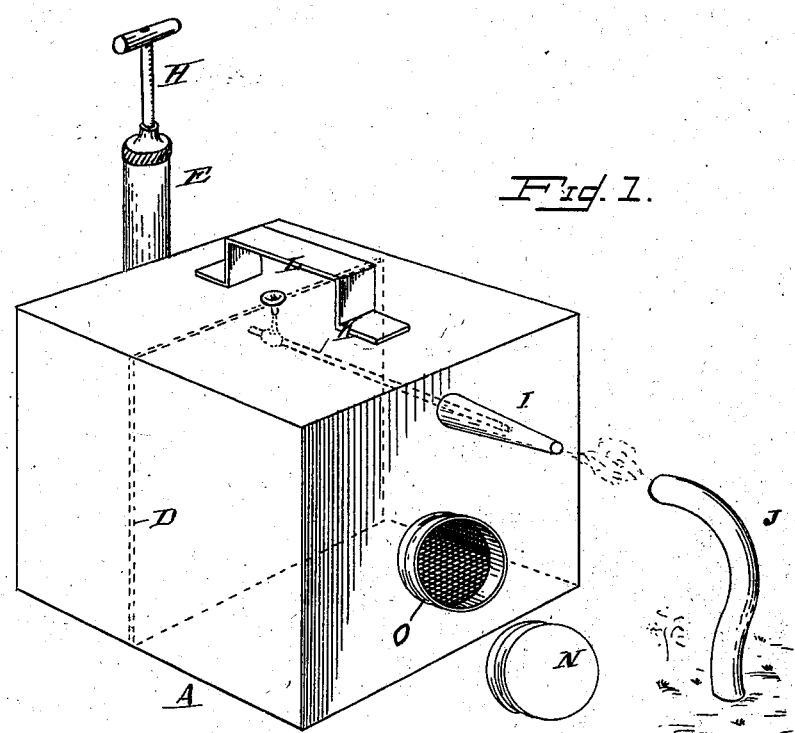
Figure 2:
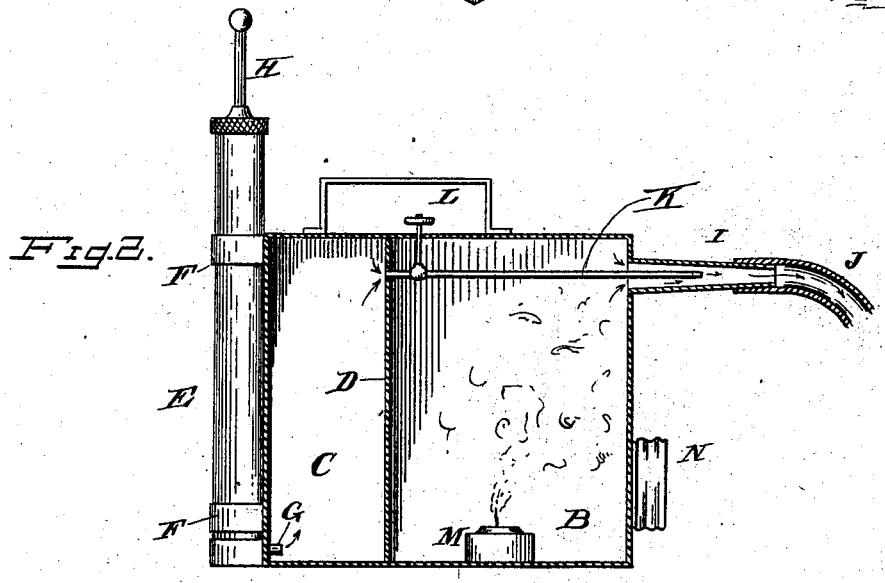

Figure 1 is a perspective view of my device. Fig. 2 is a sectional elevation thereof, showing the interior arrangement and construction.

In the figures, A represents the body of the apparatus, which I have shown of square form, although as a matter of fact any form or shape may be employed to suit the user or manufacturer. This body is composed of two compartments B and C, as shown in Fig. 2, such compartments being created by placing within the body A a partition D. At the back adjacent to the compartment C is secured an air-pump E, which may be fastened by means of suitable straps F or other good means as will present itself to the mind of the maker. Said pump, as shown in Fig. 2, is connected with the compartment C through an inlet-nipple G. The usual piston is provided for the pump, the rod for which is shown at H, so that air may be pumped into said compartment C and put under as much pressure as may be desired, the object of which will presently appear.

Attached to the front of the body A is a tube I, to the free outer end of which is or may be attached a flexible tube J, whose other end is adapted to be pushed into the burrow of the rodent to be exterminated. Projecting into such tube I is the end of a small pipe K, whose opposite end perforates the partition D and opens into the compartment C, from which the air is conducted into the tube I described. A valve L in the pipe serves to regulate or entirely stop the flow of air, as will be understood.

In the bottom of the compartment B, I place a sulfur-torch M, which when burning generates or produces a deadly fume, which, arising, would naturally find egress through the tube I. Now by having the pipe K enter the said tube and conduct air thereinto under pressure the fumes of the sulfur are forced out through said tube and into the flexible tube J, which, if inserted in the burrow, will quickly and thoroughly fill the latter with the fumes. It has been found that by this treatment the animal survives but a few seconds, and wherever the holes of the rodents are found, if treated to a supply of the sulfuric fumes, vast territories are rid of these pests in a very short time.

It will be understood that in order to reach the interior of the compartment B for entering or withdrawing the torch some means of reaching such interior must be provided, and this consists of a screw-cap N, which is designed to be screwed upon a threaded flange O, as shown in Fig. 1. Through the opening thus provided the hand may be thrust to enter or withdraw the torch, and sufficient air will be admitted through this to supply the torch with oxygen, or holes may be punched in the wall of the body to admit such air.

By employing the said air-chamber and keeping a supply of air on hand the user need merely keep the pump working leisurely, having by means of said chamber a constant supply of air under pressure. A further advantage is that a steady issuance of the fumes from the tube I will result in a more thorough and a quicker filling of the burrow from end to end.

It is at once evident that by providing a steady and unbroken current of poisonous vapor instead of a series of puffs, as in the older forms of this class of devices of which I am aware, a continuous pressure and consequent steady movement of air is started through the burrow, thus carrying the pure air out at the opposite end and substituting poisonous fumes therefor in a short space of time. This means a saving of time, less work, and surer results. The valve L, above referred to, serves to regulate the flow of air, as already stated, whereby by its use a strong or weak flow of air may be had to suit the particular work in hand, and at the same time in regulating the valve the air can be held back, so as to always have a supply at hand without the necessity of much hard or continuous pumping. Again, by closing the valve when the work is finished the air not used is retained for the next job of like nature. Hitherto a construction like mine has not been used, in so far as I am aware.

Evidently the opening in the nipple G must be larger than the opening through the pipe K, so that more air is entered to the chamber C than is carried away through said pipe. As a matter of fact, however, the valve L, which can be reached from the outside by the elongated stem thereof, can be regulated to any degree, so as to let as much or little air pass out as desired. In this way the relation of the openings just mentioned may be ignored.

Having thus made known my intents, I claim—

In a device of the character described for exterminating rodents, the rectangular hollow body having the two compartments B and C, the former in which to generate and contain poisonous fumes, the latter chamber being air-tight for containing air under pressure, an air-compression pump E adjacent to, communicating with, and adapted for compressing air within the compartment C, the same being attached to and opening into such compartment substantially as shown and described, a discharge-tube I for the compartment B the same being attached to and opening into such compartment substantially as shown, an air-conducting pipe K communicating with the air-compartment C and extending across the compartment B and terminating within the tube I for the purposes described, and the valve L in the pipe K to regulate the flow of compressed air to the outlet, or hold back such compressed air and regulate its flow, or entirely stop said flow of air as described.

In testimony whereof I affix my signature in presence of two witnesses.

JOHN B. BOYLAN, JR.

Witnesses:
L. M. THURLOW,
ARTHUR KEITHLEY.